United States Patent
Schenk et al.

(10) Patent No.: US 9,025,966 B2
(45) Date of Patent: May 5, 2015

(54) METHOD AND DEVICE FOR DRIVING A LAMP

(75) Inventors: Tim C. W. Schenk, Eindhoven (NL); Sel B. Colak, Eindhoven (DE); Johannes P. Wernars, Megen (NL); Johan P. M. G. Linnartz, Eindhoven (NL); Lorenzo Feri, Eindhoven (NL); Paulus H. A. Damink, Son en Breugel (NL); Hendricus T. G. M. Penning de Vries, Mierlo (NL)

(73) Assignee: Koninklijkle Philips N.V., Eindhoven (NL)

( * ) Notice: Subject to any disclaimer, the term of this patent is extended or adjusted under 35 U.S.C. 154(b) by 672 days.

(21) Appl. No.: 13/381,382

(22) PCT Filed: Jan. 7, 2010

(86) PCT No.: PCT/IB2010/050044
§ 371 (c)(1),
(2), (4) Date: Dec. 29, 2011

(87) PCT Pub. No.: WO2011/001296
PCT Pub. Date: Jan. 6, 2011

(65) Prior Publication Data
US 2012/0105266 A1 May 3, 2012

(30) Foreign Application Priority Data

Jun. 30, 2009 (EP) .................................. 09164106

(51) Int. Cl.
*H04B 10/00* (2013.01)
*H05B 37/02* (2006.01)

(52) U.S. Cl.
CPC ................................. *H05B 37/0272* (2013.01)

(58) Field of Classification Search
CPC .......................... H04B 10/116; H05B 37/0272
USPC ......................................................... 398/172
See application file for complete search history.

(56) References Cited

U.S. PATENT DOCUMENTS

| 5,657,145 A | 8/1997 | Smith | |
|---|---|---|---|
| 6,794,831 B2 * | 9/2004 | Leeb et al. | 315/307 |

(Continued)

FOREIGN PATENT DOCUMENTS

| JP | 02260721 A | 10/1990 |
|---|---|---|
| JP | 2006527558 A | 11/2006 |

(Continued)

*Primary Examiner* — Agustin Bello
(74) *Attorney, Agent, or Firm* — Meenakshy Chakravorty

(57) ABSTRACT

A method for driving a lamp (2) comprises the steps of: generating a lamp current ($I_{CONST}$) having a constant magnitude; defining a commutation period having a duration $T_{COMM}$; defining a time base of original commutation moments, having fixed mutual intervals of $0.5*T_{COMM}$; receiving data to be embedded in the light output; commutating the lamp current at commutation moments; wherein individual commutations are time-modulated in order to encode said received data. Preferably, a commutation moment is: either equal to an original commutation moment if there are no data to embed; or advanced over a modulation distance (Δ) with respect to the corresponding original commutation moment in order to encode data having a first value ("0"); or delayed over said modulation distance (Δ) with respect to the corresponding original commutation moment in order to encode data having a second value ("1").

10 Claims, 4 Drawing Sheets

(56) References Cited

U.S. PATENT DOCUMENTS

| | | | |
|---|---|---|---|
| 7,456,589 B2 * | 11/2008 | Sun et al. | 315/307 |
| 7,909,473 B2 * | 3/2011 | Deppe | 353/85 |
| 8,093,817 B2 * | 1/2012 | Frumau et al. | 315/151 |
| 8,253,353 B2 * | 8/2012 | Baggen et al. | 315/308 |
| 8,331,796 B2 * | 12/2012 | Wernars et al. | 398/172 |
| 8,779,680 B2 * | 7/2014 | Braunshtein | 315/291 |
| 2004/0090192 A1 * | 5/2004 | Greenwood et al. | 315/307 |
| 2004/0198233 A1 | 10/2004 | Pratt et al. | |
| 2005/0093374 A1 | 5/2005 | Connors | |
| 2005/0231128 A1 | 10/2005 | Franklin | |
| 2006/0275040 A1 | 12/2006 | Franklin | |
| 2008/0084729 A1 | 4/2008 | Cho et al. | |
| 2008/0203928 A1 * | 8/2008 | Frumau et al. | 315/151 |
| 2008/0246926 A1 * | 10/2008 | Deppe | 353/85 |
| 2009/0146580 A1 * | 6/2009 | Van Casteren et al. | 315/291 |
| 2010/0066262 A1 * | 3/2010 | Van Den Berg | 315/287 |
| 2010/0196018 A1 * | 8/2010 | Wernars et al. | 398/172 |
| 2012/0105266 A1 * | 5/2012 | Schenk et al. | 341/191 |

FOREIGN PATENT DOCUMENTS

| | | |
|---|---|---|
| WO | 2006111930 A2 | 10/2006 |
| WO | 2006111934 A1 | 10/2006 |
| WO | 2009010916 A2 | 1/2009 |
| WO | 2009040718 A2 | 4/2009 |

* cited by examiner

METHOD AND DEVICE FOR DRIVING A LAMP

FIELD OF THE INVENTION

The present invention relates in general to the field of driving lamps. The present invention relates particularly, but not exclusively, to the field of driving gas discharge lamps, and the invention will hereinafter be explained for the case of High Intensity Discharge (HID) lamps.

BACKGROUND OF THE INVENTION

For driving a light source, different current shapes are possible. Incandescent lamps and some types of gas discharge lamps may be driven by alternating current, and LEDs may be driven by direct current. HID lamps are typically driven by commutating direct current; this means that the current magnitude is constant but the current direction is reversed regularly. Since it is desirable that the average current is zero, the duration of current flow in one direction is equal to the duration of current flow in the opposite direction. Put differently: in a current period, the current flow has one direction for 50% of the period and has the other direction for 50% of the time. Since such commutation current is known per se, a further explanation is omitted here.

Generally speaking, the designer has some freedom in selecting the current frequency. However, there are some restrictions. Low frequencies, for instance less than 100 Hz, may lead to visible flicker. At higher frequencies, acoustic resonances may lead to lamp damage, so the operational frequency should be selected in a frequency range where acoustical resonances are not likely to occur. Of course, these ranges depend on lamp type.

There is a desire to be able to transmit data using the visible light emitted by a lamp. In one example, the data transmitted may relate to a unique lamp identification number, so that a receiver receiving lamp light can identify the lamp that has emitted the light. In another example, the data transmitted may relate to lamp parameters such as life time, voltage, etc, so that it is possible for maintenance personnel to verify the lamp status and decide on replacing the lamp without needing to actually approach and examine the lamp. It is already known to modulate lamp current in order to provide "coded light", but in the case of HID lamps it is not desirable to modulate the current amplitude, and the bandwidth available for frequency modulation is limited.

SUMMARY OF THE INVENTION

An object of the present invention is to provide a method for encoding data into output light generated by a light source, suitable for use with an HID lamp.

This object is achieved by the method of claim 1.

Further advantageous elaborations are mentioned in the dependent claims.

BRIEF DESCRIPTION OF THE DRAWINGS

These and other aspects, features and advantages of the present invention will be further explained by the following description of one or more preferred embodiments with reference to the drawings, in which same reference numerals indicate same or similar parts, and in which.

DETAILED DESCRIPTION OF THE INVENTION

Figure 1:
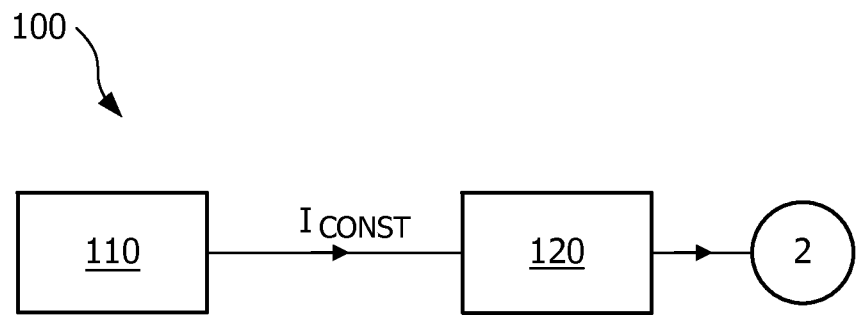
FIG. 1 schematically shows a driver for driving a gas discharge lamp.

FIG. 1 schematically shows an example of an embodiment of a driver 100 for driving a gas discharge lamp 2. This embodiment comprises a current source 110, receiving power from a suitable power source (not shown for sake of simplicity) and capable of generating constant current $I_{CONST}$ having a certain magnitude $I_M$. The driver 100 of this embodiment further comprises a commutator 120, receiving the constant current $I_{CONST}$ from the current source 110, and designed to repeatedly vary the current direction while maintaining the current magnitude $I_M$. It should be noted that other embodiments of a driver for providing commutating lamp current are also possible.

Figure 2:
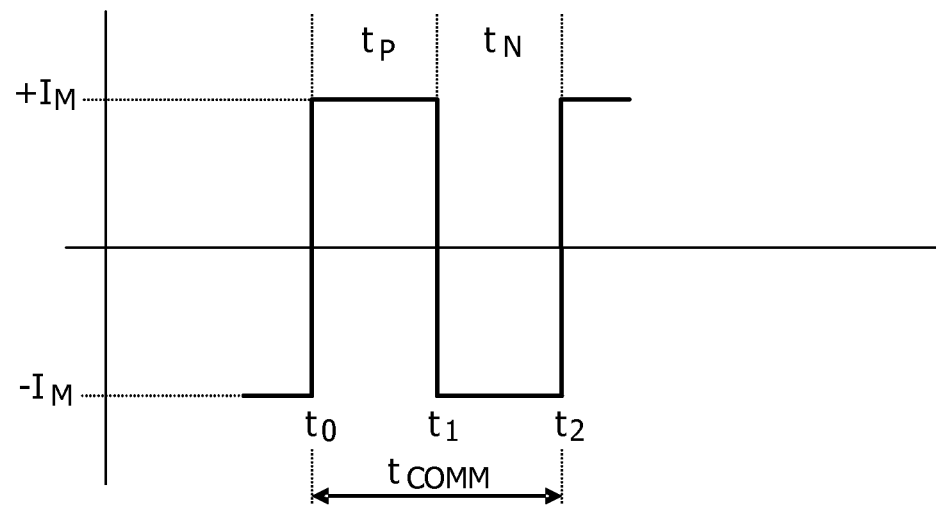
FIG. 2 is a graph schematically illustrating a conventional current wave form of a commutating current.

FIG. 2 is a graph schematically illustrating the conventional current wave form of the commutating current $I_{COMM}$ provided by the commutator 120 to the lamp 2. At time t0, the current makes a transition from negative direction to positive direction. Between times t0 and t1, the current has constant magnitude $I_M$ and positive direction, indicated as $+I_M$. At time t1, the current makes a transition from positive direction to negative direction.

Between times t1 and t2, the current has constant magnitude $I_M$ and negative direction, indicated as $-I_M$. At time t2, the current makes a transition from negative direction to positive direction again, and the above is repeated. It should be noted that it is arbitrary which current direction is indicted as "positive" and which current direction is indicted as "negative".

Hereinafter, the following definitions will be used:

1) reversing the current directions, as is done at times t0, t1, t2, will be indicated as "commutation"; commutation is shown as being infinitely fast, i.e. the duration of the commutation process is zero, but in practice the commutation will take some finite time;

2) times t0, t1, t2, when the commutation occurs will be indicated as "commutation moments";

3) a transition from positive current to negative current will be indicated as a "negative" commutation, and the corresponding commutation moments (t1) will be indicated as "negative" commutation moments; likewise, a transition from negative current to positive current will be indicated as a "positive" commutation, and the corresponding commutation moments (t0, t2) will be indicated as "positive" commutation moments;

4) the frequency of the current signal will be indicated as the commutation frequency $f_{COMM}$; the inverse of this will be indicated as the commutation period $T_{COMM}=1/f_{COMM}=(t2-t0)$;

5) the commutations divide the commutation period in two commutation time segments, i.e. a "positive" commutation time segment having duration $t_P=(t1-t0)$ between a positive commutation moment and a subsequent negative commutation moment, and a "negative" commutation time segment having duration $t_N=(t2-t1)$ between a negative commutation moment and a subsequent positive commutation moment; it should be clear that $T_{COMM}=t_P+t_N$.

Conventionally, $t_P=t_N=0.5*T_{COMM}$; it should be clear that consequently the average current is zero (no DC component).

Figure 3:
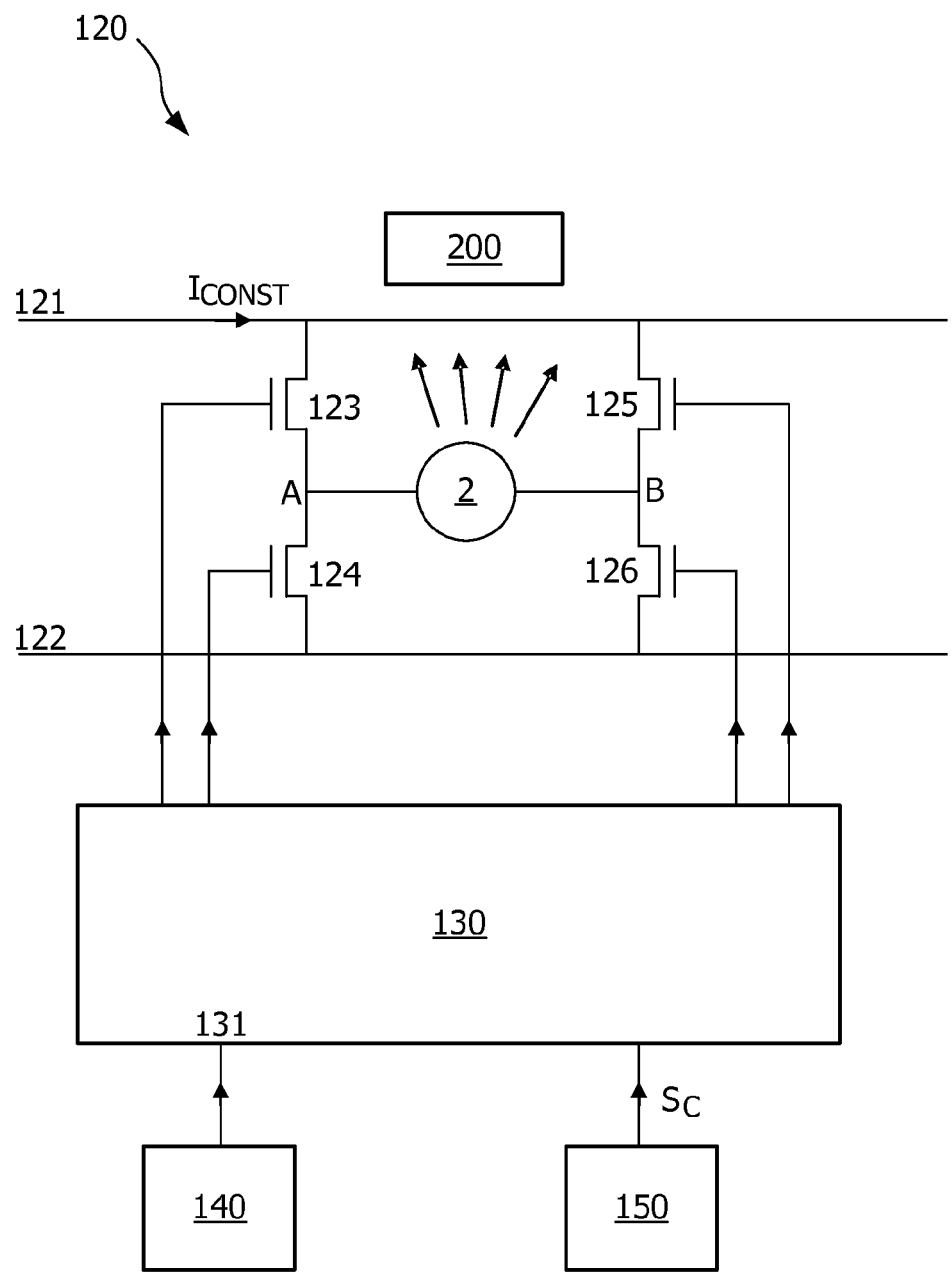
FIG. 3 is a block diagram schematically illustrating a commutator.

FIG. 3 is a block diagram schematically illustrating a possible embodiment of the commutator 120; it should be noted that other embodiments of a commutator are also possible. The commutator 120 comprises two power lines 121 and 122, receiving the constant current $I_{CONST}$. A first series arrangement of two controllable switches 123, 124 is connected between the power lines 121 and 122, with a first node A in between. A second series arrangement of two controllable switches 125, 126 is connected between the power lines 121 and 122, with a second node B in between. Lamp 2 is connected between said nodes A and B. The switches 123, 124, 125, 126 are controlled by a control device 130, for instance a suitably programmed microprocessor or controller, that can operate in one of two states: in a first state, switches 123 and 126 are conductive while switches 124 and 125 are non-conductive, so that the current through the lamp flows from A to B; in a second state, switches 123 and 126 are non-conductive while switches 124 and 125 are conductive, so that the current through the lamp flows from B to A. It should be clear that these two controller states correspond to the commutation time segments mentioned above. It should further be clear that the timing of the transition from the first controller state to the other or vice versa determines the timing of the commutation moments.

The control device 130 is provided with a clock device 150, providing a clock signal Sc for defining a time base corresponding to the commutation frequency $f_{COMM}$. This time base allows the control device 130 to determine the commutation moments. For sake of clarity, the clock device 150 is depicted as being external of the control device 130, but it may also be integrated in the control device 130.

Figure 4:
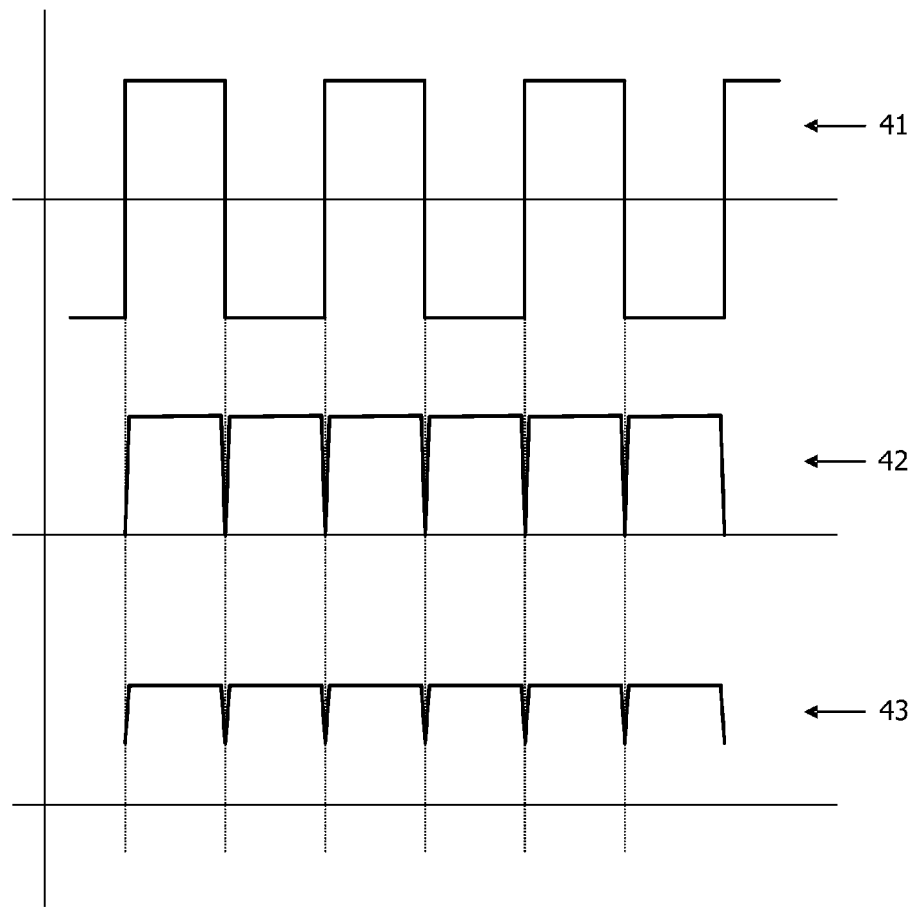
FIG. 4 is a timing diagram.

FIG. 3 also shows schematically a receiver 200, arranged to receive the light emitted by the lamp 2. It is noted that the receiver 200 is capable of detecting the commutation moments, as will be explained with reference to the timing diagram of FIG. 4. In FIG. 4, curve 41 shows the commutating lamp current. Curve 42 shows the corresponding lamp power, which shows power dips coinciding with the commutation moments since commutation can not be infinitely fast. Curve 43 shows the corresponding output light level, which also shows dips corresponding to the power dips, although not necessarily going down to zero in view of the inherent inertia of the lamp physics. From FIG. 4, it should be clear that the light dip frequency is twice as high as the lamp current frequency. The receiver 200 will be capable of detecting the light intensity dips, as should be clear to a person skilled in the art without the need for further explanation.

It is noted that the receiver 200 can not distinguish between light generated with positive current and light generated with negative current. Consequently, the receiver 200 can not directly identify positive commutation moments and negative commutation moments.

Figure 5:
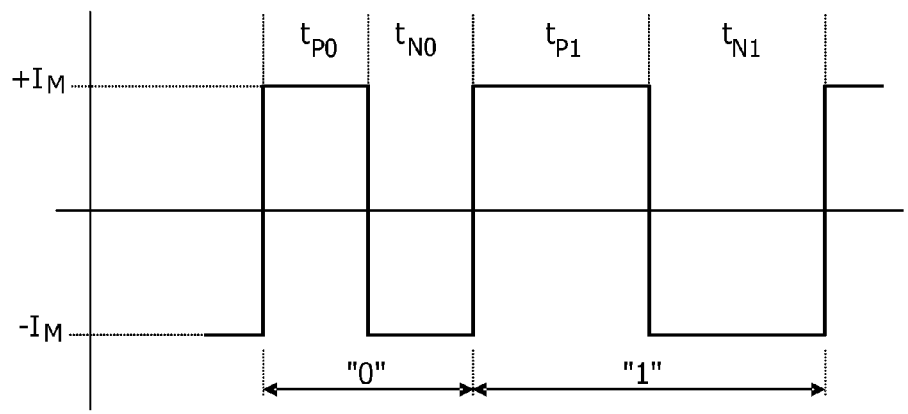
FIG. 5 is a graph schematically illustrating a conventional current wave form of a commutating current with data coding.

According to the present invention, the driver 100 is capable of coding data into the lamp output light by modulation of the timing of the commutation moments. To that end, the control device 130 has a data input coupled to receive binary data from a data source 140 (FIG. 3); the nature of the data source is not relevant, but by way of example the data source 140 may comprise a memory containing an identification number. The control device 130 is designed to vary the timing of the commutation moments depending on the momentary data bits. This principle as such is known, in general. FIG. 5 is a graph illustrating a coding scheme of an earlier proposal.

For encoding a bit having value "0", the timing of the commutation moments is set such that within one current period the positive segment duration of a positive commutation time segment has a value $t_{P0}$ and the negative segment duration of a negative commutation time segment has a value $t_{N0}$, with $t_{P0}=t_{N0}$. For encoding a bit having value "1", the timing of the commutation moments is set such that within one current period the positive segment duration of a positive commutation time segment has a value $t_{P1}$ and the negative segment duration of a negative commutation time segment has a value $t_{N1}$, with $t_{P1}=t_{N1}$. Further, $t_{P0}=t_{N0} \neq t_{P1}=t_{N1}$: in the example shown, $t_{P0}=t_{N0}<t_{P1}=t_{N1}$. Consequently, $T_{COMM,0}<T_{COMM,1}$ An advantage of this earlier coding scheme is that the average current is always zero, intrinsically. Another advantage is that it is relatively easy for a receiver to recognize the current periods, but a disadvantage is that it is more difficult to actually synchronise with the current periods. Further, a disadvantage is that the data rate $f=1/T_{COMM}$ depends on the data content.

Figure 6:
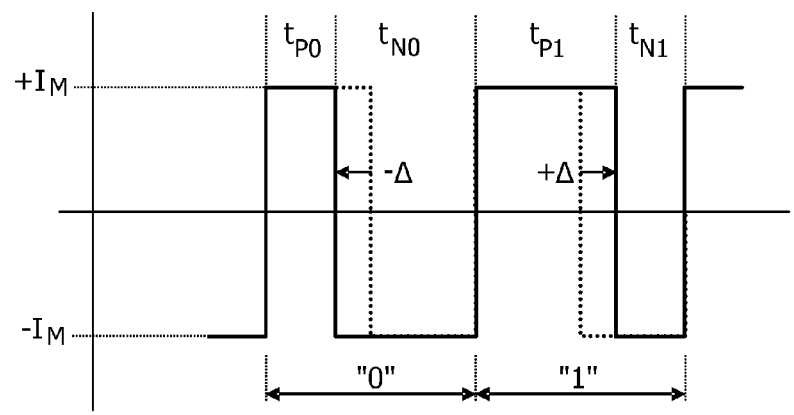
FIG. 6 is a graph schematically illustrating a commutating current with data coding according to the present invention.

The present invention proposes a data encoding scheme where $T_{COMM}$ is constant so that the data rate $f=1/T_{COMM}$ does not depend on the data content. FIG. 6 is a graph comparable to FIG. 5, illustrating an example of the data encoding scheme according to the present invention. For encoding a bit having value "0", the timing of the commutation moments is set such that within one current period with duration $T_{COMM}$ the positive segment duration of a positive commutation time segment has a value $t_{P0}=0.5*T_{COMM}-\Delta$ and the negative segment duration of a negative commutation time segment has a value $t_{N0}=0.5*T_{COMM}+\Delta$. For encoding a bit having value "1", the timing of the commutation moments is set such that within one current period with duration $T_{COMM}$ the positive segment duration of a positive commutation time segment has a value $t_{P1}=0.5*T_{COMM}+\Delta$ and the negative segment duration of a negative commutation time segment has a value $t_{N1}=0.5*T_{COMM}-\Delta$.

An advantage of this scheme is that the current periods always have the same duration. This makes synchronisation easier for the receiver 200, since the time interval between a light dip and the second successive should always have the same value if the dips coincide with the period borders.

It is to be noted that the average current of one current period now depends on the data contents. However, on a larger time scale, the average current can be equal to zero again if the number of 0s in a certain time period is equal to the number of 1s. In the incoming data stream, it can of course not be guaranteed that the number of 0s is equal to the number of 1s on any time scale, while it is desirable that the average current is with certainty equal to zero on a relatively short time scale. To assure this, the control device 130 is designed to translate incoming data bits to outgoing transmission bytes, wherein each outgoing transmission byte, which may comprise any suitable even number of transmission bits, contains 50% 0s and 50% 1s. By way of example, in a simple embodiment, incoming data bit 0 may correspond to outgoing data byte 01 while incoming data bit 1 may correspond to outgoing data byte 10: in that case, the average current is always equal to zero on a time scale corresponding to 2 times the current period. Other, more sophisticated, translation schemes are possible, allowing the average current to be equal to zero on a somewhat larger time scale, as should be clear to a person skilled in the art. Examples of such schemes are Walsh-Hadamard block codes or run length limited block codes.

In the above embodiment, current periods are defined between two successive positive commutation moments while the timing of the negative commutation moments is modulated with +Δ or −Δ in accordance with a data bit to be coded. It is also possible to define current periods between two successive negative commutation moments while the timing of the positive commutation moments is modulated.

In the above embodiment, the timing of a commutation moment within a current period is modulated with +Δ or −Δ in accordance with a data bit to be coded. In other words, the timing of this commutation moment is shifted with respect to its normal, non-modulated timing, which is at 50% of the current period. In the following, the shifting distance with respect to the normal, non-modulated timing will be indicated as the modulation distance. The modulation distance is defined to be positive if the modulation involves a delay or negative if the modulation involves an advance.

In the above embodiment, the absolute value of the modulation distance can only have one value, so that it is possible to encode one transmission data bit in one current period. It is also possible to allow multiple possible values for the absolute value of the modulation distance, on order to be able to encode multiple transmission data bits in one current period. For instance, modulation distances −2Δ, −Δ, +Δ, +2Δ can encode for two bits (00, 01, 10, 11) in one current period.

In the above embodiment, only half of the commutation moments (the negative commutation moments) are time-modulated while the other half of the commutation moments (the positive commutation moments) are not. In the above explanation, the commutation moments to be modulated are explained as those which are located at 50% of each period, while the periods are explained as being defined by non-modulated commutation moments. However, this is not necessary. As explained above, the control device 130 has available a clock signal Sc, allowing to define a time base of original non-modulated commutation moments, having fixed mutual intervals of $0.5*T_{COMM}$. Considering this time base as reference, it is possible to time-modulate the negative commutation moments as well as the positive commutation moments. This will allow for a doubling of the data rate.

In order to facilitate synchronisation of the receiver 200, it is preferred that, at regular time intervals, a fixed data pattern is included in the data stream, known to the receiver. Such data pattern may for instance include a series of "01" sequences.

Summarizing, the present invention provides a method for driving a lamp 2, which method comprises the steps of:
  generating a lamp current $I_{CONST}$ having a constant magnitude;
  defining a commutation period having a duration $T_{COMM}$;
  defining a time base of original commutation moments, having fixed mutual intervals of $0.5*T_{COMM}$;
  receiving data to be embedded in the light output;
  commutating the lamp current at commutation moments;
  wherein individual commutations are time-modulated in order to encode said received data.

Preferably, a commutation moment is:
  either equal to an original commutation moment if there are no data to embed;
  or advanced over a modulation distance 4 with respect to the corresponding original commutation moment in order to encode data having a first value "0";
  or delayed over said modulation distance 4 with respect to the corresponding original commutation moment in order to encode data having a second value "1".

While the invention has been illustrated and described in detail in the drawings and foregoing description, it should be clear to a person skilled in the art that such illustration and description are to be considered illustrative or exemplary and not restrictive. The invention is not limited to the disclosed embodiments; rather, several variations and modifications are possible within the protective scope of the invention as defined in the appending claims.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

In the above, the present invention has been explained with reference to block diagrams, which illustrate functional blocks of the device according to the present invention. It is to be understood that one or more of these functional blocks may be implemented in hardware, where the function of such functional block is performed by individual hardware components, but it is also possible that one or more of these functional blocks are implemented in software, so that the function of such functional block is performed by one or more program lines of a computer program or a programmable device such as a microprocessor, microcontroller, digital signal processor, etc.

The invention claimed is:

1. Method for driving a lamp, the method comprising the steps of:
  generating a lamp current having a constant magnitude;
  defining a commutation period having a duration $T_{COMM}$;
  receiving data to be embedded in the light output of the lamp;
  commutating the lamp current at commutation moments;
  defining a time base of original commutation moments, having fixed mutual intervals of $0.5*T_{COMM}$; and
  time-modulating individual commutations relative to the original commutation moments in order to encode said received data in the light at a constant data rate.

2. Method according to claim 1, comprising the steps of:
  calculating commutation moments on the basis of said time base of original commutation moments and on the basis of the received data, wherein the calculated commutation moment is:
    either equal to an original commutation moment if there are no data to embed;
    or advanced over a modulation distance with respect to the corresponding original commutation moment in order to encode data having a first value;
    or delayed over said modulation distance with respect to the corresponding original commutation moment in order to encode data having a second value.

3. Method according to claim 2, wherein the modulation distance has one fixed value in order to be able to encode one bit per commutation moment.

4. Method according to claim 2, further comprising the step of selecting the value of the modulation distance from a predetermined range of possible values in order to be able to encode multiple bits per commutation moment.

5. Method according to claim 1, wherein every second commutation moment always coincides with the time base while only the commutation moments in between said second commutation moments are time-modulated.

6. Method according to claim 1, wherein all commutation moments are time-modulated independently from each other.

7. Method according to claim 1, wherein a series of one or more received data bits are translated to a packet containing an even number of outgoing transmission bits, wherein in each packet the number of transmission bits with a first value is equal to the number of transmission bits with a second value, and wherein modulation of the commutation moments is always performed on the basis of the transmission bits.

8. Method according to claim 1, further comprising the step of regularly embedding a predetermined data sequence leading to a predetermined pattern of commutation moments for facilitating synchronisation in a receiver.

9. Method according to claim 1, wherein said data to be embedded includes an identification code of the lamp concerned.

10. Driver for driving a light source, comprising a current source for producing a constant current and a commutator for commutating this current, the driver being designed for executing the method of claim 1.

* * * * *